United States Patent [19]

Higuchi et al.

[11] 4,293,357
[45] Oct. 6, 1981

[54] METHOD FOR PRODUCING CERAMIC HONEYCOMB FILTERS

[75] Inventors: Noboru Higuchi; Teruo Yano, both of Nagoya; Masahiro Ohnishi, Kuwana, all of Japan

[73] Assignee: NGK Insulators, Ltd., Nagoya, Japan

[21] Appl. No.: 167,731

[22] Filed: Jul. 14, 1980

[30] Foreign Application Priority Data

Jun. 16, 1980 [JP] Japan .................................. 55-80107

[51] Int. Cl.$^3$ ............................................ C03B 29/00
[52] U.S. Cl. ...................................... 156/89; 55/523; 156/253; 264/63
[58] Field of Search ................. 156/89, 252, 253, 278, 156/280; 55/523–524, 520; 210/497, 487; 264/63, 67; 165/166

[56] References Cited

U.S. PATENT DOCUMENTS

| | | | |
|---|---|---|---|
| 2,322,548 | 6/1943 | Sigmund | 55/520 X |
| 2,397,759 | 4/1946 | Sigmund | 55/520 X |
| 3,885,942 | 5/1975 | Moore | 165/166 X |
| 4,041,591 | 8/1977 | Noll | 55/523 X |

*Primary Examiner*—David A. Simmons
*Attorney, Agent, or Firm*—Stevens, Davis, Miller & Mosher

[57] ABSTRACT

A ceramic honeycomb filter having a large filter area and a low pressure loss is produced by adhering a film on an opening end surface of a porous ceramic honeycomb structural body having a large number of parallel channels extending therethrough, boring holes at a given portion of the film or adhering a film bored at a given portion to an opening end surface of a porous ceramic honeycomb structural body, charging a sealing material into the channels through the bores in the film to seal an end portion of the given channels, and then sealing another end surface of the remaining channels with the sealing material in the same manner as described above.

14 Claims, 8 Drawing Figures

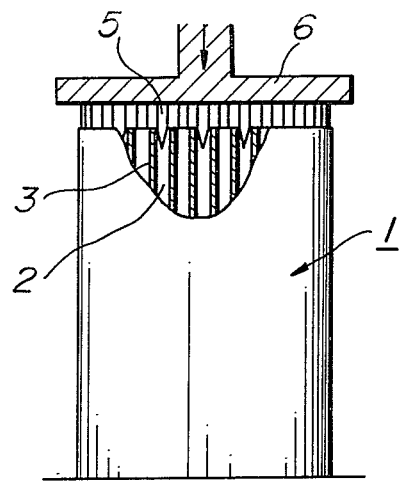
FIG_6
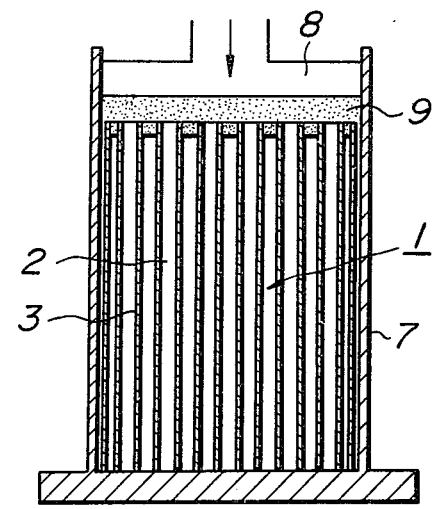
FIG_7
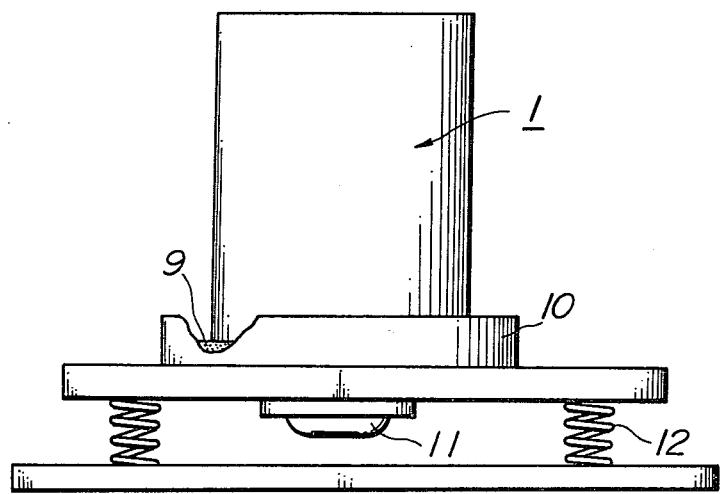
FIG_8

METHOD FOR PRODUCING CERAMIC HONEYCOMB FILTERS

The present invention relates to a method for producing ceramic honeycomb filters.

Heretofore, filters involve ones wherein various fillers, such as adsorbing materials and the like are arranged, steel wools, ceramic fibers, porous porcelains and the like but in filters aiming at removing fine particles, unless the filters having fine meshes are used, the removing efficiency cannot be improved but this inadvantageously results into increase of the pressure loss when a high filtration rate is required. As a means for enlarging the filter area in the prior sheet-formed, plate-formed or cylindrical filters, relatively simple structures, such as a corrugated structure, a double cylindrical form and the like are usual and a remarkable increase of the filter area per unit area has not been attained. Therefore, in order to avoid the high pressure loss, the filter volume becomes fairly larger and it has been very difficult to obtain a small size of filter.

Honeycomb structural bodies have been recently broadly used for catalyst support for purifying exhaust gas of automobiles, heat exchanger for gas turbine and the like and a larger number of parallel channels extending therethrough having a given cross-sectional shape, such as circle, triangle, tetragon, hexagon, corrugate and the like are uniformly distributed and the channels are parallel and straight, so that the pressure loss of the gas flow is very small and the surface area per unit volume is large and the channels are separated by thin walls, so that the heat-up can be easily made in a small heat amount. However, as the conventional application, the thin partition walls separating a larger number of channels have been limited to the function for flowing gas to react a catalyst coated on the thin walls with harmful gases, such as carbon monoxide (CO), hydrocarbons (HC), nitrogen oxides (NOx) and the like in the exhaust gas to purify said gases.

Methods for producing ceramic honeycomb structural bodies include various processes, for example a paper dipping process wherein an organic porous sheet is impregnated with a ceramic slurry and a honeycomb structural body is formed and the formed body is fired, a pipe binding process wherein a large number of given shaped pipes are bound, an extrusion process wherein a batch raw material is extruded through a die provided with a large number of given shaped slits and a press process. If a method for producing a ceramic honeycomb structural body is explained in more detail with respect to an extrusion process, to fine powders of a ceramic raw material, such as alumina, silica, mullite, silicon carbide, silicon nitride and/or cordierite are added an organic binder and a plasticizer, the mixture is kneaded to prepare a composition consisting mainly of ceramic raw material, this composition is extruded through a die provided with a large number of slits, which forms a given shape, for example a polygon such as a triangle, tetragon, hexagon and the like, circle, oval, etc. in the cross section of the channels to form a monolith structure, and the shaped structure is dried and fired to obtain a porous ceramic honeycomb structural body.

It has been noticed that such a honeycomb structural body has a thin wall thickness and is noticeably large in the surface area per unit volume and it has been attempted that the honeycomb structural body is used as a filter. For example, by sealing one end surface of alternate given channels of a honeycomb structural body composed of a porous ceramic material and having a large number of channels in a checker flag pattern and sealing another end surface of the remaining channels, a compact ceramic filter capable of removing fine particles and having a low pressure loss in which the thickness of the filter is far more thin than that of a conventional ceramic filter and the available area of the filter can be structurally enlarged, can be provided.

The present invention consists in a method for producing a ceramic honeycomb filter having a low pressure loss, which comprises applying a film on one end surface of opening of a porous ceramic honeycomb structural body having a large number of parallel channels extending therethrough, boring holes through the film applied on the given channels (or applying a film bored at a given portion to an opening end surface of a porous ceramic honeycomb structural body), charging a sealing material into the channels through the holes bored on the film to seal the end portions of the given channels.

Another object of the present invention is to provide a method for producing a ceramic honeycomb structural body which filters fine particles through the thin partition walls of the honeycomb structural body, which comprises applying a film such as paper on one of opening end surfaces of the porous ceramic honeycomb structural body having a large number of channels, boring holes through the film at the given position, for example, at the position corresponding to alternate channels, charging a sealing material through the holes on the film, applying a film in the same manner as described above on another opening end surface of the above described ceramic honeycomb structural body, boring holes through the film applied on another end surface of the remaining channels and charging a sealing material into the bored holes to seal the given perforated channels.

Further object of the present invention is to provide a method for producing a ceramic honeycomb filter wherein a material having dilatancy is used as the sealing material for a ceramic honeycomb filter.

The present invention will be explained in more detail hereinafter.

For better understanding of the invention, reference is taken to the accompanying drawings, wherein:

FIG. 6 is a schematic view for explaining a means for boring holes on a film by using a needle jig to be used in the production method of the present invention;

FIG. 7 is a schematic view for explaining the state where a sealing material to be used in the production method of the present invention is forcedly charged into the channels by means of a piston; and FIG. 8 is a schematic view for explaining the vibration charging of a sealing material to be used in the production method of the present invention.

Figure 1:
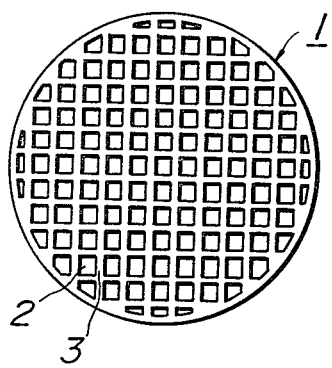
FIG. 1 is a front view showing one embodiment of honeycomb structural body.
Figure 2:
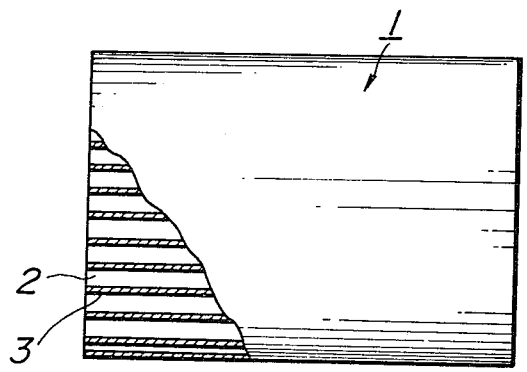
FIG. 2 is a partially removed side view of the honeycomb structural body shown in FIG. 1.
Figure 3:
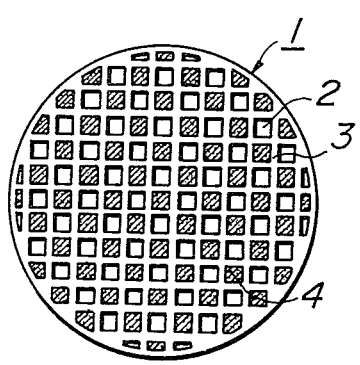
FIG. 3 is a front view showing one embodiment of a ceramic honeycomb filter produced according to the production method of the present invention.
Figure 4:
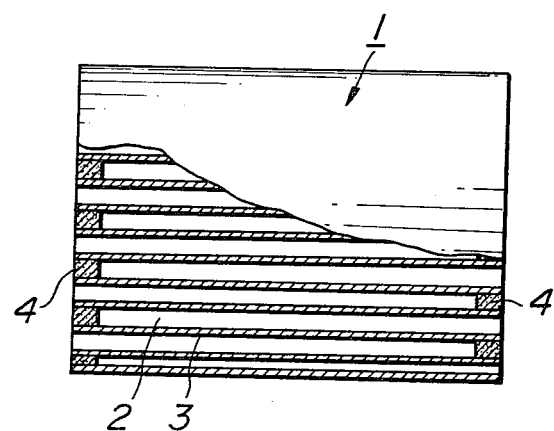
FIG. 4 is a partially removed side view of the ceramic honeycomb filter shown in FIG. 3.

FIG. 1 and FIG. 2 show the case where the cross section of the channels is a tetragon as one embodiment of the ceramic honeycomb structural body and FIG. 3 and FIG. 4 show an embodiment of ceramic honeycomb structural body 1 wherein alternate channels 2 are sealed with a sealing material 4 and another end of the remaining channels 2 is sealed with the sealing material 4 in the same manner to form checker flag patterns on the both end surfaces of the channels by the sealing material, whereby the filter function is acted through the partition walls of the porous ceramic honeycomb. Namely, one end of the channels 2 of the honeycomb structural body is sealed with a sealing material 4 and another end of the remaining channels 2 is sealed with the sealing material 4 and the thin porous partition walls 3 forming the channels are used as the filter.

Figure 5:
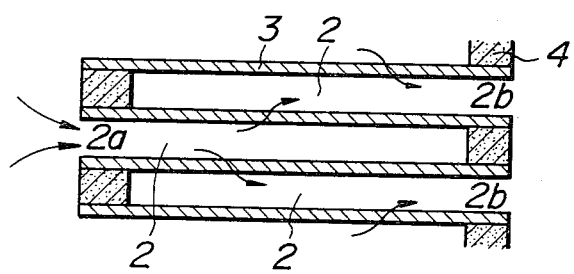
FIG. 5 is a schematic view for explaining the filter of the present invention.

FIG. 5 is a partial enlarged view of the ceramic honeycomb filter shown in FIG. 4 and an explanation will be made with respect to the effect of the filter according to the present invention with reference to FIG. 5. The filter is set so that the direction of the channels is parallel to a gas flow containing fine particles and the gas flow flowed into the filter through an opening portion 2a at the end surface of the gas inlet side passes through the thin porous ceramic partition walls forming the channels, because another end is sealed, and transfers to the adjacent channels, which open at the gas outlet side, and is discharged from the opening portion 2b. That is, the thin porous partition walls 3 forming the perforated channels 2 act the function of filter and floating fine particles in the gas are filtered.

The ceramic honeycomb filter according to the present invention is produced as follows. Firstly, to one end surface of opening of a ceramic honeycomb structural body is adhered a film. This film must have the properties that the film has an enough strength not to be broken when the sealing material is charged into the channels in the next step, and is burnt off by firing or simply peeled off.

As the film, a paper, a paper impregnated with a resin, and an organic high molecular weight film, such as polyester, vinyl resins and the like are preferable. The film is preferably tightly adhered to throughout the end surface of opening of the honeycomb structural body and a paper impregnated with a sticky resin on one surface is pressed and tightly adhered to one end surface of the opening of the channels.

Then, the film applied to the opening portion 2a of the channels 2 to be sealed is bored to form holes. As the process for boring holes through the film, a needle jig 6 provided with needles 5 is pressed to the film so that the needles position to the film where the holes are to be bored through the film as shown in FIG. 6, a wheel provided with teeth at a pitch conforming to the portions to be bored holes, is rotated on the film, which is not shown in the drawing, or the film is cut by a knife to form holes.

The holes may be bored at an optional position within the channel portions and the size of the holes may not be equal to that of the channels, but it may be somewhat smaller than that of the channels. After boring holes through the film, a sealing material is charged into the channels through the film holes to seal the end portions of the given channels.

The sealing material should have the dilatancy. If the sealing material has the dilatancy, when the sealing material is charged into the channels by pressure, the sealing material loses the fluidity and the sealing material is charged into the channels in such a form that the top portion of the sealing material becomes a semisphere and the sealing material can seal uniformly the channels in the substantially completely filled state along the shape of said channels and in a uniform depth along throughout the channels to be sealed. By the dilatancy of the sealing material, when charging the sealing material into the channels, even if the size of the holes is somewhat smaller than that of the channels, the sealing material expands the hole portions by pressure and enters the channels and adheres tightly thereto to seal the channels. On the other hand, when a sealing material having thixotropy is used, the fluidity of the sealing material increases with pressure and does not expand the bored hole portions and deeply enters into the inner portion of the channels while the top portion of the sealing material is maintaining a pointed form and the strength sticking to the inner wall of the channels is low and the sealing material is disengaged from the wall and the function for the sealing material is not attained.

As mentioned above, the sealing material should have the dilatancy and this can be obtained by selecting ceramic material, binder and/or plasticizer to be used.

The term "dilatancy" used herein means the property of increasing in volume when charged in shape because of an increase of the space between the particles, that is, the property of a viscous suspension which sets solids under the influence of pressure.

As the sealing material, use may be made of cordierite and mullite, for example. When one embodiment of a composition of cordierite sealing material is mentioned, a binder of 0.5–2.0 parts by weight of methyl cellulose and 5–15 parts by weight of glycerine are added to 100 parts by weight of cordierite powder and 25–35 parts by weight of water is added thereto as a plasticizer and the mixture is kneaded to obtain a green batch. In mullite sealing material, a binder of 0.5–2.0 parts by weight of methyl cellulose and 5–20 parts by weight of polyvinyl alcohol is added to 100 parts by weight of mullite raw material powder and 20–35 parts by weight of water is added thereto and the mixture is kneaded to obtain a green batch. These batches have the preferable dilatancy.

As a process for charging the sealing material into the channels through the bored holes in the film, as shown in FIG. 7 a honeycomb structural body 1 applied with a bored film is put in a cylinder 7 having a more or less larger outer diameter than the honeycomb structural body, a sealing material 9 is mounted thereon and then the sealing material 9 is pressed by a piston 8 to charge the sealing material into the channels 2. The pressure is applied in a load of 5–50 kg/cm$^2$, so that the depth of the sealing material becomes uniform. When the sealing material is too hard and the sealing material must be charged under a high pressure, firstly holes are bored through a film at the channel portions not to be sealed and epoxy resin and the like are charged into the bored channels by dipping process and hardened and then the film is peeled off and a sealing material is charged under a high pressure.

When a sealing material having a high viscosity is used, an end portion of a honeycomb structural body applied with a bored film is dipped in a sealing material to charge said material into the channels (not shown in a drawing). Thereafter, the honeycomb structural body providing the ceramic sealing material is fired at a temperature of 800°–1,400° C. while applying the film or resin to burn the film or resin and sinter the sealing material to produce a ceramic honeycomb filter wherein the given end portions are sealed.

Alumina cement kneaded sealing material is produced by adding 50-300 parts by weight of mullite or chamotte powders and 25-40 parts by weight of water to 100 parts by weight of alumina cement. The thus formed alumina cement batch has a high dilatancy and when a pressure is applied, the batch immediately sets solid and it is difficult to fill the channels with the batch to the desired depth and as shown in FIG. 8, one end portion of the fired honeycomb structural body 1 applied with the bored film is dipped in a dish 10 containing a sealing material 9 and vibration is applied thereto by means of a vibrator 11 to charge the sealing material consisting of alumina cement kneaded composition into the channels.

After finishing the charging of the sealing material, the honeycomb structural body sealed with the alumina cement batch is placed in a hardening chamber at a temperature of 50-60° C., under a humidity of 80-95% for 2-4 hours to harden the sealing material and then the film is peeled off to obtain the given ceramic honeycomb filter.

The following examples are given for the purpose of illustration of this invention and are not intended as limitations thereof.

EXAMPLE 1

This example shows a method for producing a honeycomb filter, in which both ends are sealed in a checker flag pattern as shown in FIG. 3 with respect to a cordierite honeycomb having a diameter of 120 mm, a length of 150 mm, a thickness of partition walls of the channels of 0.30 mm and 200 cells/inch$^2$ of channels.

Firstly, a film composed of a paper impregnated with a sticky resin on one surface was tightly applied on an opening end surface of the fired ceramic honeycomb structural body. Then, the film was pressed with a needle jig so that the needles were inserted into the channels to be sealed in a checker flag pattern, to bore holes.

A sealing material was prepared by adding 1 part by weight of methyl cellulose, 10 parts by weight of glycerine and 33 parts by weight of water to 100 parts by weight of pulverized cordierite raw material which has been passed through a screen of 105 μm and kneading the mixture to form a green batch. Then, the honeycomb structural body applied with the bored film was put in a cylinder having a diameter of 126 mm and the sealing material was put on the honeycomb structural body and a load of 30 kg/cm$^2$ was applied on the sealing material downwardly by a piston to charge the sealing material into the channels. The same operation was made with respect to another end surface to charge the sealing material into the channels. Then, the honeycomb structural body was fired at a maximum temperature of 1,400° C. for two hours. In the obtained honeycomb filter, the depth of the sealed portion from the end surfaces was 8±3 mm and the sealing material completely filled and clogged the channels and gas did not leak through the sealing portions.

This sample was measured with respect to the pressure loss by using air at room temperature and in the case of 2 m$^3$/min., the pressure loss was 60 mm H$_2$O and this filter area was about 15,500 cm$^2$.

EXAMPLE 2

A film composed of polyester, one surface of which was applied with a sticky resin, was applied on an opening end surface of a non-fired dried mullite honeycomb having a diameter of 120 mm, a length of 150 mm, a thickness of partition walls of channels of 0.4 mm and about 100 cells/inch$^2$ of channels. The film at the channel portions to be sealed was cut with a sharp knife so that a checker flag pattern was formed. A sealing material was prepared by adding 1 part by weight of methyl cellulose, 8 parts by weight of polyvinyl alcohol and 30 parts by weight of water to 100 parts by weight of mullite powders which have passed through a screen of 44 μm and kneading the mixture. The honeycomb structural body applied with a bored film was put in a cylinder and the sealing material was mounted on the honeycomb structural body and a pressure of 30 kg/cm$^2$ was applied thereon downwardly by a piston to charge the sealing material into the channels. The same operation was made on another end surface of the honeycomb to charge the sealing material into the channels, after which the honeycomb structural body was fired at a maximum temperature of 1,400° C. for two hours. In the obtained mullite honeycomb filter, the depth of the sealed portions from the end surface of the honeycomb was 8±3 mm and the sealing material substantially completely filled the channels and gas did not leak through the sealing portions.

This sample was measured with respect to the pressure loss by using air at room temperature and in the case of 2 m$^3$/min., the pressure loss was 50 mm H$_2$O and the filter area was about 11,000 cm$^2$.

EXAMPLE 3

A film of paper impregnated with a sticky resin at one surface was applied on an opening end surface of a fired cordierite honeycomb structural body having a diameter of 120 mm, a length of 150 mm, a thickness of partition walls of channels of 0.30 mm and 200 cells/inch$^2$ of channels. Then, needles were pressed to the film to bore holes so that the channels to be sealed became a checker flag pattern. One end surface of the honeycomb structural body applied with the bore film was dipped in a vessel containing the sealing material and vibration was applied thereto by a vibrator 11 as shown in FIG. 8 to charge the sealing material into the channels.

The sealing material was prepared by adding 33 parts by weight of water to 100 parts by weight of a ceramic raw material obtained by mixing commercially available alumina cement and pulverized mullite which has passed through a screen of 44 μm in a weight mixture ratio of 1:1. This sealing material showed a higher dilatancy than the sealing materials shown in Examples 1 and 2 and was not able to be satisfactorily charged into the channels only by pressure but the sealing was made by applying vibration. The honeycomb structural body charged with the sealing material was placed in a hardening chamber and left to stand at a temperature of 55° C., a humidity of 90% for two hours and then the film applied on the end surfaces were peeled off to obtain a ceramic honeycomb filter as shown in FIGS. 3 and 4.

In this ceramic honeycomb filter, the depth of the sealing portion was 10±4 mm and the sealing material substantially completely filled the channels and gas did not leak through the sealing portion. The filter area of this sample was about 15,000 cm$^2$ and the pressure loss of air at room temperature was 70 mm H$_2$O in the case of 2 m$^3$/min.

EXAMPLE 4

A film of paper, one surface of which was impregnated with a sticky resin, was applied on an opening end surface of cordierite honeycomb structural body having a diameter of 120 mm, a length of 120 mm, a thickness of partition walls of channels of 0.40 mm and about 100 cells/inch$^2$ of channels. A wheel provided with teeth manufactured conforming to a pitch of channels to be sealed in a checker flag pattern was rotated on the film to bore holes through the film.

A sealing material was prepared by mixing 20 parts by weight of starch paste and 100 parts by weight of mullite powders and the resulting sealing material was mounted on the honeycomb structural body and a load of 10 kg/cm$^2$ was applied thereto by a piston to charge the sealing material into the channels and the thus treated honeycomb structural body was fired at a maximum temperature of 1,300° C. for two hours.

In the obtained honeycomb filter, the sealing material did not tightly adhere to the partition walls even at a position of 70–120 mm from the end surface of the channels and the gas leak was high and the sealing material was partially disengaged easily off from the channels and the obtained honeycomb structural body did not act the filter function.

The results of the examples of the ceramic honeycomb filters according to the present invention are shown in the following table.

TABLE

| Example | Material of honeycomb structural body | Sealing material | Binder | Sealing process | Firing | Depth (mm) | Leak | Estimation of sealing state |
|---|---|---|---|---|---|---|---|---|
| 1 | cordierite | cordierite | methyl cellulose + glycerine | press | o | 8 ± 3 | no | o |
| 2 | mullite | mullite | methyl cellulose + PVA | press | o | 8 ± 3 | no | o |
| 3 | cordierite | alumina cement + mullite | — | vibration | x | 10 ± 4 | no | o |
| 4 | cordierite | mullite | starch paste | press | o | 70 ~ 120 | leak | x |

Note:
Mark o: Firing was carried out.
Mark x: Firing was not carried out.
Estimation of sealing state,
Mark o: Satisfied.
Mark x: Not satisfied.

As seen from the above described examples, by the method for producing the ceramic honeycomb filter according to the present invention wherein a film is adhered to the end surfaces of the ceramic honeycomb structural body, holes are bored through the film at the given channels, a batch of a sealing material having the dilatancy is charged into the given channels to a given uniform depth to seal the channels and then the thus treated honeycomb structural body is fired to integrate the honeycomb structural body and the sealing material, the ceramic honeycomb filter having a stable quality wherein the sealed portions have the same high heat resistance as in the ceramic honeycomb structural body can be easily mass-produced and is very effective for removing fine powdery carbon dusts in exhaust gas at high temperatures in Diesel engine and other internal combustion engines. Furthermore, when the ceramic honeycomb filters according to the present invention are arranged before ceramic honeycomb catalyst depositing a catalyst for removing CO, HC, NOx and the like, it is very effective for preventing clogging of the ceramic honeycomb catalyst and fine particles, such as carbon dusts collected through the filter function are burnt by the exhaust gas at high temperatures to be converted into CO, HC or NOx, which are removed by the catalyst, so that the ceramic honeycomb filters according to the present invention are not necessary to be cleansed and can be continuously used and this is very commercially useful.

What is claimed is:

1. A method for producing a ceramic honeycomb filter comprises adhering a film on an opening end surface of a porous ceramic honeycomb sructural body having a large number of channels extending therethrough, boring holes through the film at a given portion, charging a sealing material into the channels through the bores in the film to seal an end portion of the given channels.

2. The method as claimed in claim 1, wherein said film is at least one material selected from the group consisting of a paper, a paper impregnated with a resin and an organic high molecular weight film.

3. The method as claimed in claim 1, wherein the sealing material has dilatancy.

4. The method as claimed in claim 1, wherein the sealing material is a batch obtained by mixing ceramic raw material with a binder and a plasticizer, or alumina cement mixture.

5. The method as claimed in claim 4, wherein said binder is a cellulose derivative, a polyhydric alcohol or a mixture of a cellulose derivative and a polyhydric alcohol.

6. The method as claimed in claim 1, wherein the sealing material is charged into the channels under pressure, through vibration and/or by dipping.

7. The method as claimed in claim 1, wherein one end surface of a given channels is sealed with a sealing material and then another end surface of the remaining channels is sealed with the sealing material.

8. A method for producing a ceramic honeycomb filter comprises adhering a film having holes bored at a given portion to an opening end surface of a porous ceramic honeycomb structural body having a large number of channels, charging a sealing material into the channels through the holes in the film to seal an end portion of the given channels.

9. The method as claimed in claim 8, wherein said film is at least one selected from the group consisting of a paper, a paper impregnated with a resin and an organic high molecular weight film.

10. The method as claimed in claim 8, wherein the sealing material has dilatancy.

11. The method as claimed in claim 8, wherein the sealing material is a batch obtained by mixing ceramic raw material with a binder and a plasticizer, or alumina cement mixture.

12. The method as claimed in claim 11, wherein said binder is a cellulose derivative, a polyhydric alcohol or a mixture of a cellulose derivative and a polyhydric alcohol.

13. The method as claimed in claim 8, wherein the sealing material is charged into the channels under pressure, through vibration and/or by dipping.

14. The method as claimed in claim 8, wherein one end surface of a given channels is sealed with a sealing material and then another end surface of the remaining channels is sealed with the sealing material.

* * * * *